3,586,639
DISPERSION OF ASBESTOS
Roy F. House, Houston, Tex., assignor to National Lead
  Company, New York, N.Y.
No Drawing. Filed Mar. 8, 1967, Ser. No. 621,464
    Int. Cl. B01j *13/00;* C03b *37/00*
U.S. Cl. 252—313                                10 Claims

ABSTRACT OF THE DISCLOSURE

A process is disclosed whereby chrysotile and tremolite can be dispersed, in aqueous suspension, into the individual sub-microscopic fibrils comprising the aggregates of the raw material. Dispersion is effected by shearing the starting material in a solution of an organic acid having not more than six carbon atoms together with a long-chain cationic reagent, both in minor proportion by weight to the asbestos. Dispersion is rapid, viscosities and gel strengths of the dispersion are relatively low, and the dispersions are stable upon standing. The separated fibrils may be recovered for various uses.

---

This invention relates to a method of dispersing certain asbestos varieties into their individual fibrils, and more particularly, to an improvement whereby rapid dispersion is obtained with stability and low viscosities.

Chrysotile and tremolite are two mineral varieties within the broad category of asbestos minerals, and are characterized by a particularly well-defined fibrous habit. Chrysotile is by far the commonest and most widely used type of asbestos, and most of its uses depend upon a greater or less degree of separation of the fibrils from one another. Since the advent of the electron microscope, it has been known that fibrous varieties of asbestos, such as chrysotile, are made up of compact parallel aggregates of individual elementary fibers, or more accurately, fibrils, which have a diameter of only about a millionth of an inch. In older methods of separating the fiber bundles of asbestos, for example as in making asbestos paper, mechanical grinding has been employed, which probably does not bring about much separation of the elementary fibrils individually from one another. The latter can be accomplished, however, by various chemical treatments, and the resulting change in the physical properties of the suspension is very great, because of the vast number of individual fibrils comprising even a single fiber bundle as may be teased apart from a piece of chrysotile.

A number of ways of accomplishing a chemical separation or dispersion of asbestos into the ultimate elementary fibrils appear in the prior art. Thus, U.S. Pat. No. 2,626,213, to Novak, employs surface active agents in aqueous solution; U.S. Pat. No. 2,661,287, to Barbaras, utilizes certain salts of trivalent metals, such as aluminum chloride, again in aqueous suspension; U.S. Pat. No. 2,995,514, to Jordan et al., utilizes certain oil-soluble surface active agents in an oleagenous system.

Those processes for dispersing asbestos wherein an oily medium is used are not well adapted to the production of separated asbestos fibers per se, because of the necessity of getting rid of the oil. Many of the aqueous processes have other disadvantages, among which are excessively high viscosities in the dispersed system, and also instability of the dispersion, either upon standing, or upon dilution with additional water, or both.

An object of the present invention is to provide a process for dispersing chrysotile and tremolite and, indeed, mixtures thereof into their elementary fibrils, using certain reagents in aqueous suspension, to produce dispersions having good stability.

Other objects of the invention will appear as the description thereof proceeds.

Generally speaking, and in accordance with illustrative embodiments of the invention, I bring together the selected asbestos mineral, which may be chrysotile or tremolite or indeed mixtures thereof in any proportions; water; an organic acid additive as well as a long-chain cationic reagent additive; and I then subject the mixture thus formed to shearing until the desired degree of separation of the individual fibrils has been accomplished. The order of addition of the various ingredients of the mixture is not critical. Thus, I may add the asbestos to the water and then introduce the chemical additives; or I may first dissolve the chemical additives in the water and then add the asbestos. In some cases, there is a slight advantage in bringing together the asbestos, the water, and the organic acid additive, and then subsequently introducing the cationic reagent; and in general I prefer this procedural route.

The shearing may be carried out with any of the mechanical high-shear arrangements common in chemical industry, such as described, for example, in chapter 10 of the book, Chemical Process Machinery, by Riegel, Ed. 2, New York, 1953. Thus, for small batches, a laboratory shearing device of the type exemplified by the well-known "Waring Blendor" may be used, and for larger batches, a tank with dispersator-type agitation. More drastic types of agitation, such as high-speed colloid mills, may be used if desired, and in general are required for processing high concentrations of asbestos. Again, shearing may be carried out at room temperature, and this is generally most convenient. Increased temperatures reduce the time required, but the additional expense is often not justified.

The concentration of asbestos conveniently used is fairly well determined by practical considerations. As a general rule, one to five percent by weight is optimum for shearing with dispersator-type equipment. More dilute concentrations, such as 0.1 percent asbestos, may be used with success, but this entails handling a disproportionate amount of water for the asbestos treated and thus is uneconomical. As the concentration of asbestos is increased upwardly of one percent, the dispersions naturally become thicker, and pose handling problems. Thus, ten to twenty percent asbestos by weight is, in most cases, so thick that heavy-duty mechanical equipment, such as a Manton Gaulin mill, is needde to shear the resulting dispersion. A practical upper limit is 25 percent by weight of asbestos. The concentration of asbestos selected for treatment by the process will also be dependent upon the use to which the dispersion is to be put.

The organic acid employed in the invention should be present in a weight ratio to the asbestos of at least 1:50, but in any case, sufficient to give a pH not higher than six, and indeed, within a range of three to six. We have found that a preferred range is four to five pH. It will be appreciated that the amount of organic acid required will increase somewhat as the molecular weight of the acid increases, although in general not in direct proportion thereto, and will also be a function of the acid strength and the type of asbestos treated. More than the optimum may be used, but this is uneconomical, and indeed, for the stronger acids in higher concentration, there is some danger of actual dissolution of the asbestos, so that a practical maximum ratio is approximately 1:2 by weight.

The amount of the long-chain cationic reagent is again best proportioned to the weight of the asbestos, and it will be found that at least 1:100 must be used; that is, one pound of the cationic reagent for each one hundred pounds of the asbestos. An average practical optimum ratio is approximately 1:8. There is really no absolute maximum amount, since we have found that higher amounts have no harmful effect, but in general are wasteful since the cationic reagent is much more expensive than the asbestos. We have found that the hardness of the water used has an effect in that somewhat larger amounts of cationic reagents must be used in tap water than in distilled water.

The organic acid which I use is chosen from the class which consists of the following, in which the various headings are followed by some illustrative, typical species:

(a) Alkyl, alkenyl and alkadienyl monocarboxylic acids from $C_1$ through $C_6$:

formic
acetic
propionic
n-butyric
acrylic
sorbic (2,4 hexadienoic)

(b) Alkyl, alkenyl and alkadienyl monocarboxylic acids from $C_1$ through $C_6$ having up to five hydroxyl groups attached to the hydrocarbon radical:

lactic ($\alpha$-hydroxypropionic)
gluconic (pentahydroxycaproic)

(c) Alkyl, alkenyl and alkadienyl monocarboxylic acids from $C_1$ through $C_6$ having up to two chlorine atoms attached to the hydrocarbon radical:

monochloracetic
dichloroacetic (d) Alkyl, alkenyl and alkadienyl monocarboxylic acids from $C_1$ through $C_6$ having an oxygen double bonded to a hydrocarbon radical carbon, i.e., a keto group:

pyruvic ($\alpha$-keto propionic)

(e) Alkyl, alkenyl and alkadienyl monocarboxylic acids from $C_1$ through $C_6$ having a methoxy group attached to a hydrocarbon radical carbon:

methoxyacetic (f) Alkyl, alkenyl and alkadienyl sulfonic acids from $C_1$ through $C_4$:

methanesulfonic
ethanesulfonic (g) Alkyl, alkenyl and alkadienyl arsonic acids from $C_1$ through $C_4$:

1-butane arsonic (h) Pyridine carboxylic acids:

nicotinic
picolinic
isonicotinic

The alkyl, alkenyl and alkadienyl groups on the monocarboxylic sulfonic and arsonic acids may be straight chained or branched.

The long-chain cationic reagent additive which I use may be chosen from a large group of substances, various examples of which will be given hereinbelow, and which I have found all to have the characteristic of possessing at least one nitrogenous ammonium group and at least 14 aliphatic carbon atoms. Those skilled in the art will recognize that they are thus substituted ammonium cations. As a simple example, I may cite tetradecylammonium ion, such as is produced by acidifying tetradecyl amine with any acid. Thus, tetradecylammonium acetate is a common article of commerce. It will be seen that a wide variety of alkyl, alkenyl and alkadienyl primary, secondary, tertiary, and quaternary amines, or more properly stated, ammonium ions, are available for use in accordance with the invention. Thus, dimethyldidodecylammonium ion, octadecylammonium ion, and the like, are quite suitable.

It will be understood that the substituted ammonium ion is accompanied by a neutralizing anion, when the salt form of the long-chain cationic reagent additive is employed. Thus, they are available as various substituted ammonium salts of common acids, such as hydrochloric, acetic, sulphuric, and the like. The organic acid additive which forms a part of the invention may also be used for forming the substituted ammonium salt. Thus, distearyl amine may be neutralized with acetic or propionic acids so as to form the salt, viz, the acetate or propionate, as the case may be. Alternatively, the substituted ammonium compound in its free base, i.e., free amine form, may be added to the asbestos-water mixture together with sufficient acid to bring about the desired pH, the range of which, being acid, insuring the conversion of the free base to the cation form.

I do not restrict myself to simple substituted ammonium compounds of the types already described. Thus, I may utilize polyamines, particularly polyalkyleneamines, to form long-chain cationic reagent additives having the characteristics already recited. For example, a wide range of fatty acids may be added in less than equivalent proportions to a polyethyleneamine so as to form a partial salt of the fatty acid, which is then heated so as to convert the salt linkage to an amide linkage. This is a well-known, widely used expedient for the production, at relatively low cost, of substituted ammonium compounds of the type in question. Thus, I may add two moles of octanoic acid to one mole of diethylenetriamine, so as to neutralize by salt formation two of the three amino groups of the latter, and then heat for two hours at about 400° F. to form the corresponding amido amine.

In the heating step described, some polymerization takes place in addition to the amidification. This is discussed, for example, in U.S. Pat. No. 2,291,396, second page thereof. Thus, if diethylenetriamine and octanoic acid are reacted as just described, the "ideal" monomer amide would have a total of 20 carbon atoms and one amine nitrogen; but in all probability, the molecular weight is considerably higher than this. In some of the examples which follow, these amides, as derived from various polyamines, are named as monomers without reference to polymerization for the sake of convenience.

A preferred group of such "amido-amines" is constituted by the reaction products of a polyethyleneamine selected from the class consisting of diethylenetriamine, triethylenetetramine, and tetraethylenepentamine and sufficient of a fatty acid having at least eight carbon atoms to react with at least one of the amino groups of the polyethyleneamine but insufficient to react with all of such amino groups, said reaction product having been heated to at least 400° F. so as to result in conversion of salt linkages to amide linkages.

Another particularly useful group of substituted ammonium cations consists of substituted imidazoline cations having the formula 1-$R_1$, 2-$R_2$, 2-imidazoline, where $R_1$ is selected from the class consisting of 2-amino methyl, 2-amino ethyl, 2-hydroxy methyl, 2-hydroxy ethyl; and $R_2$ is selected from the class consisting of $C_{14}$–$C_{18}$ inclusive alkyls, alkenyls and alkadienyls. Specific examples of such substituted imidazoline cations appear in Table I hereinbelow.

Some examples of the carrying-out of the invention will now be given, which inter alia will serve to show a variety of specific long-chain cationic reagent additives. In a standard test which has been developed to give an indication of the relative suitability of various organic acid additives and various long-chain cationic reagent additives, a stated amount of a selected chrysotile or tremolite is mixed with water and with stated amounts of selected acid additives and cationic reagent additives (together, or separately with shearing in between) to give a total of 400 grams of mixture, which is then sheared for a short period of time, such as 5 minutes or 10 minutes, in a laboratory mixer such as the Waring Blendor. The sheared mixture is then cooled to room temperature since the action of the mixer generally warms the initially room-temperature ingredients; whereupon the pH is determined with an electrometric pH meter, and the rheological properties of the slurry are determined with a precision viscometer, which in our routine test was that known as the Fann viscometer; the slurry is then allowed to stand quiescent and is examined after a few minutes, as well as the next day, for any evidence of flocculation or aggregation of the asbestos. For the case of a 1.0 percent by weight asbestos slurry, that is, for 4 grams of asbestos in a 400-gram charge to the Blendor, we have found that those slurries exhibiting an apparent viscosity greater than five centipoises showed some evidence of asbestos separation after settling overnight. For the preparation listed in Table 1, which follows, which are all for a 1.0 percent suspension as just described, those having apparent viscosities of 5.0 centipoises and less were all stable, showing no separation, flocculation, or aggregation of the asbestos after standing overnight, and thus exhibited in a completely satisfactory fashion the advance made possible by this invention. The organic acid was acetic, at 15 percent based on the weight of asbestos; the cationic reagent was at 5 percent by weight of asbestos; and the asbestos was chrysotile from Coalinga, Calif., trade designation "Coalinga Red" as obtained from the Johns-Manville Company.

TABLE 1.—DATA OBTAINED FROM DISPERSANTS

| Long-chain cationic reagent | Fann viscosities, room temperature | | | | | pH [1] |
|---|---|---|---|---|---|---|
| | 600 r.p.m. | 300 r.p.m. | A.V. | P.V. | Y.P. | |
| Coco-alkylamine ($C_8$–$C_{18}$) | 4.5 | 2.5 | 2.25 | 2.0 | 0.5 | 4.7 |
| Octadecylammonium chloride | 4.0 | 2.0 | 2.0 | 2.0 | -0- | 4.5 |
| Tallow-alkyl amine ($C_{14}$–$C_{18}$) | 3.5 | 2.5 | 1.75 | 1.0 | 1.5 | 4.6 |
| Didodecylamine | 8.0 | 6.5 | 4.0 | 1.5 | 5.0 | 4.6 |
| Di-hydrogenated-tallow amine | 9.5 | 7.5 | 4.75 | 2.0 | 5.5 | 4.5 |
| Dimethylcocoamine | 4.5 | 3.5 | 2.25 | 2.0 | 1.5 | 4.5 |
| Dimethyl hydrogenated-tallow amine | 4.0 | 2.0 | 2.0 | 2.0 | -0- | 4.5 |
| Trimethyloctadecylammonium chloride | 4.0 | 2.0 | 2.0 | 2.0 | -0- | 4.6 |
| Dimethyldicocoammonium chloride | 4.0 | 2.0 | 2.0 | 2.0 | -0- | 4.5 |
| Dimethylbenzlhydrogenated-tallow-ammonium chloride | 3.0 | 1.5 | 1.5 | 1.5 | -0- | 4.5 |
| Methyltrioctylammonium chloride | 4.5 | 3.5 | 2.25 | 1.0 | 2.5 | 4.5 |
| Dimethylditetradecylammonium chloride | 3.0 | 1.5 | 1.5 | 1.5 | -0- | 4.4 |
| Dimethyldodecylbenzylhydrogenated-tallow-ammonium chloride | 4.0 | 3.0 | 2.0 | 1.0 | 2.0 | 4.5 |
| Dimethylfurfurylhydrogenated-tallow-ammonium chloride | 3.5 | 2.0 | 1.75 | 1.5 | 0.5 | 4.4 |
| Dimethyldidodecylammonium chloride | 3.0 | 1.5 | 1.5 | 1.5 | -0- | 4.4 |
| Para-diisobutylphenoxyethoxyethyl-dimethylbenzylammonium chloride | 7.0 | 5.5 | 3.5 | 1.5 | 4.0 | 4.5 |
| Para-diisobutylcresoxyethyoxyethyl-dimethylbenzylammonium chloride | 5.5 | 4.5 | 2.75 | 1.0 | 3.5 | 4.5 |
| 1-(2-hydroxyethyl)-2-coco-2-imidazoline | 3.5 | 2.0 | 1.75 | 1.5 | 0.5 | 4.7 |
| Mixed substituted imidazolines: | | | | | | |
| Principally 1-(2-amino methyl)-2-alkyl-2-imidazolines [2] | 3.0 | 1.5 | 1.5 | 1.5 | -0- | 4.5 |
| 1-(2-hydroxyethyl)-2-heptadecenyl-1(or 3)-benzyl-2-imidazolinium chloride | 4.5 | 2.5 | 2.25 | 2.0 | 0.5 | 4.5 |
| Mixed 1-(2-hydroxyethyl)-2-heptadecenyl and heptadecadienyl-1(or 3)-(4-chorobutyl)-2 imidazolinium chloride | 4.0 | 2.5 | 2.0 | 1.5 | 1.0 | 4.4 |
| Polyoxyethylene (15) dimethyl-stearyl-ammonium chloride | 4.5 | 3.5 | 2.25 | 1.0 | 2.5 | 4.5 |
| Di(2-hydroxypropyl) methyl hydrogenated-tallow ammonium chloride | 3.5 | 2.0 | 1.75 | 1.5 | 0.5 | 4.6 |
| Cocoamine acetate | 4.0 | 3.0 | 2.0 | 1.0 | 2.0 | 4.5 |
| Tallow amine acetate | 3.0 | 1.5 | 1.5 | 1.5 | -0- | 4.5 |
| N-coco-1, 3-propylenediamine | 4.5 | 2.5 | 2.25 | 2.0 | 0.5 | 4.6 |
| N-tallow-1, 3-propylenediamine | 4.0 | 2.0 | 2.0 | 2.0 | -0- | 4.7 |
| N-tallow-1, 3-propylenediamine diacetate | 3.0 | 1.5 | 1.5 | 1.5 | -0- | 4.4 |
| 3-t-dodecylaminopropylamine | 7.0 | 6.0 | 3.5 | 1.0 | 5.0 | 4.6 |
| N,N-dihydrogenated-tallow-1, 3-propylenediamine | 3.0 | 1.5 | 1.5 | 1.5 | -0- | 4.5 |
| N-coco-N,N-dimethyl-N',N',N'-trimethyl-1,3-propylene diammonium chloride | 10.0 | 8.0 | 5.0 | 2.0 | 6.0 | 4.5 |
| t-Alkyl ($C_{18}$–$C_{22}$) primary amine | 7.5 | 6.0 | 3.75 | 1.5 | 4.5 | 4.7 |
| Morpholinohydroxystearyl amine | 4.5 | 3.5 | 2.25 | 1.0 | 2.5 | 4.6 |
| Diethanolaminohydroxystearyl amine | 3.5 | 2.5 | 1.75 | 1.0 | 1.5 | 4.5 |
| Dodecylaminohydroxystearyl amine | 3.0 | 1.5 | 1.5 | 1.5 | -0- | 4.6 |
| Anilinohydroxystearyl amine | 3.0 | 1.5 | 1.5 | 1.5 | -0- | 4.4 |
| β-Aminoethylaminohydroxystearyl amine | 4.0 | 2.5 | 2.0 | 1.5 | 0.5 | 4.7 |
| β-Aminoethylaminohydroxystearyl nitrile | 7.0 | 6.0 | 3.5 | 1.0 | 5.0 | 4.6 |

[1] pH is overnight pH.
[2] Alkyl is mixed $C_{14}$, $C_{16}$, $C_{18}$.

NOTE.—A.V. is apparent viscosity; P.V. is plastic viscosity; Y.P. is yield point;

As mentioned, useful cationic additives can be readily made from polyethyleneamines. In Table 2, which follows, results are given for tests made as described for Table 1, in which the cationic additive was prepared by reacting one mole of tetraethylenepentamine with 1.0, 1.5, 2.0, 2.5, and 3.0 moles of tall oil fatty acid, respectively, at 390–410° F. for 2 hours. These are listed in Table 2 as "amido-amine," followed by the fraction of nitrogen atoms reacted with the fatty acid, which for the equimolar product was 0.2, and so forth.

In Table 4, which follows, results are given for tests made in the same fashion as described in connection with Table 3 hereinabove, except that diethylenetriamine was used instead of tetraethylenepentamine. The reaction products were made in the same fashion, the mole ratio of fatty acid to the polyamine being indicated in the first column. The abbreviations are the same as in Table 3, with the addition of HPA, designating heptanoic acid. The pH's were as for Table 3.

TABLE 4

| | Mole acid/ mole DETA reacted to obtain dispersant | Acid used in preparing dispersant | Fann viscosities, room temperature | | | | |
|---|---|---|---|---|---|---|---|
| | | | 600 r.p.m. | 300 r.p.m. | A.V. | P.V. | Y.P. |
| Amido-amine: | | | | | | | |
| 1/1–OA | 1.0 | Octanoic | 2.5 | 1.5 | 1.25 | 1.0 | 0.5 |
| 2/1–OA | 2.0 | ...do | 2.5 | 1.5 | 1.25 | 1.0 | 0.5 |
| 2/1–HPA | 2.0 | Heptanoic. | 9.0 | 7.5 | 4.5 | 1.5 | 6.0 |

TABLE 2

| | Fann viscosities, room temperature | | | | | Overnight pH |
|---|---|---|---|---|---|---|
| | 600 r.p.m. | 300 r.p.m. | A.V. | P.V. | Y.P. | |
| Amido-amine: | | | | | | |
| 0.2 | 4.0 | 2.0 | 2.0 | 2.0 | –0– | 4.6 |
| 0.3 | 4.0 | 2.0 | 2.0 | 2.0 | –0– | 4.6 |
| 0.4 | 4.0 | 2.0 | 2.0 | 2.0 | –0– | 4.5 |
| 0.5 | 5.5 | 4.5 | 2.75 | 1.0 | 3.5 | 4.6 |
| 0.6 | 8.5 | 7.0 | 4.25 | 1.5 | 5.5 | 4.6 |

In Table 3, which follows, results are given for amido-amines prepared as described in connection with Table 2, except that shorter-chain fatty acids were used, which are identified in the first column by the letters OA, HA, VA, BA, and PA, designating respectively octanoic, hexanoic, valeric, butyric, and propionic acids. These tests were made by mixing 4 grams of the same asbestos as used for Table 1, 0.80 ml. acetic acid, and 395 grams of distilled water for 9 minutes in the Waring Blendor. 0.6 gram of the cationic additive, designated in the first column, was then added, and the mixture agitated for one minute in the Waring Blendor. The dispersions were cooled to room temperature and tested as for Table 1. The overnight pH's were all in the range 4.0–5.0.

As mentioned, a wide variety of acid additives may be used. Table 5 gives the results obtained with a number of acids within the scope of the invention. These tests were made by mixing 4 grams of the asbestos described for Table 1 with 0.80 ml. of the acid, and 0.27 gram of 75 percent active commercial dimethyldicocoammonium chloride in 395 grams distilled water. The mixture was sheared for 10 minutes in the Waring Blendor and then tested as already described. As will be appreciated, heptanoic acid is outside the scope of the invention, and is included in Table 5 to show the negative results obtained.

Table 5A, immediately following Table 5, gives the test results in the case of four selected acids, the samples being made up as described in Table 5, except that the long-chain cationic additive was omitted entirely. In the case of caproic acid, no dispersion was obtained at all, while in the case of the other three acids shown in Table 5A, dispersion was obtained, but the suspensions were unstable and flocculated.

It will be noted that the apparent viscosities are all high relative to those obtained in accordance with the invention as shown in the tables preceding Table 5A. This illustrates the extraordinary synergism involved in the mechanism of the invention. I do not hazard an explanation as to the precise mechanisms which may be involved.

TABLE 3

| | Mole acid/ mole TEPA reacted to obtain dispersant | Acid used in preparing dispersant | Fann viscosities, room temperature | | | | |
|---|---|---|---|---|---|---|---|
| | | | 600 r.p.m. | 300 r.p.m. | A.V. | P.V. | Y.P. |
| Amido-amine: | | | | | | | |
| 0.6–HA | 3.0 | Hexanoic | 4.5 | 3.5 | 2.25 | 1.0 | 2.5 |
| 0.6–VA | 3.0 | Valeric | 6.0 | 5.0 | 3.0 | 1.0 | 4.0 |
| 0.6–BA | 3.0 | Butyric | 8.0 | 6.5 | 4.0 | 1.5 | 5.0 |
| 0.6–PA | 3.0 | Propionic | 5.0 | 4.5 | 2.5 | 0.5 | 4.0 |
| 0.4–VA | 2.0 | Valeric | 6.0 | 5.0 | 3.0 | 1.0 | 4.0 |
| 0.4–BA | 2.0 | Butyric | 8.0 | 7.0 | 4.0 | 1.0 | 6.0 |
| 0.2–OA | 1.0 | Octanoic | 4.0 | 3.0 | 2.0 | 1.0 | 2.0 |
| 0.2–VA | 1.0 | Valeric | 7.5 | 6.0 | 3.75 | 1.5 | 4.5 |
| 0.2–HA | 1.0 | Hexanoic | 4.5 | 3.5 | 2.25 | 1.0 | 2.5 |
| 0.2–BA | 1.0 | Butyric | 8.0 | 6.5 | 4.0 | 1.5 | 5.0 |
| 0.2–PA | 1.0 | Propionic | 8.5 | 7.0 | 4.25 | 1.5 | 5.5 |

TABLE 5

| Acid | Fann viscosimeter data, room temperature | | | | | Overnight pH |
|---|---|---|---|---|---|---|
| | 600 r.p.m. | 300 r.p.m. | A.V. | P.V. | Y.P. | |
| Formic | 3.5 | 2.5 | 1.75 | 1.0 | 1.5 | 3.4 |
| Acetic | 3.5 | 2.0 | 1.75 | 1.5 | 0.5 | 4.3 |
| Propionic | 3.5 | 2.0 | 1.75 | 1.5 | 0.5 | 4.5 |
| N-butyric | 3.5 | 2.0 | 1.75 | 1.5 | 0.5 | 4.6 |
| N-valeric | 5.0 | 3.5 | 2.5 | 1.5 | 2.0 | 4.8 |
| I-Valeric | 3.5 | 2.0 | 1.75 | 1.5 | 0.5 | 4.8 |
| Caproic | 11.5 | 8.5 | 5.75 | 3.0 | 5.5 | 5.0 |
| N-heptanoic | (1) | (1) | (1) | (1) | (1) | |
| Lactic | 3.0 | 1.5 | 1.5 | 1.5 | -0- | 3.8 |
| Acrylic | 3.0 | 1.5 | 1.5 | 1.5 | -0- | 4.0 |
| Methoxyacetic | 2.5 | 1.5 | 1.25 | 1.0 | 0.5 | 4.4 |
| Methanesulfonic | 2.5 | 1.5 | 1.25 | 1.0 | 0.5 | 4.3 |
| Ethane sulfonic | 2.5 | 1.5 | 1.25 | 1.0 | 0.5 | 4.4 |
| 1-butanearsonic [2] | 3.5 | 2.0 | 1.75 | 1.5 | 0.5 | 4.6 |

[1] No dispersion—asbestos separation.
[2] 0.8 gram rather than 0.8 ml.

TABLE 5A

| Acid | Fann viscosimeter data, room temperature | | | | | Overnight pH |
|---|---|---|---|---|---|---|
| | 600 r.p.m. | 300 r.p.m. | A.V. | P.T. | Y.P. | |
| Acetic | 15.4 | 12.0 | 7.75 | 3.5 | 8.5 | 4.5 |
| Propionic | 12.5 | 10.0 | 6.25 | 2.5 | 7.5 | 4.6 |
| N-butyric | 17.0 | 12.5 | 8.5 | 4.5 | 8.0 | 4.7 |
| Caproic | (1) | (1) | (1) | (1) | (1) | |

[1] No dispersion—asbestos separation.

Table 6 gives results for a further selection of acid additives, the tests being carried out as described in connection with Table 5, except that the long-chain cationic additives was the reaction product, as already described, of 3 moles of tall oil fatty acid and 2 moles of tetraethylenepentamine. Here again, octanoic acid is outside the scope of the invention, and failed to work.

TABLE 6

| Acid | Fann viscosimeter data, room temperature | | | | | Overnight pH | Weight amidoamine added, gram |
|---|---|---|---|---|---|---|---|
| | 600 r.p.m. | 300 r.p.m. | A.V. | P.V. | Y.P. | | |
| Pyruvic | 6.5 | 6.0 | 3.25 | 0.5 | 5.5 | 4.6 | 0.20 |
| Dichloroacetic | 2.5 | 1.5 | 1.25 | 1.0 | 0.5 | 4.4 | 0.20 |
| Gluconic [1] | 5.5 | 5.0 | 2.75 | 1.5 | 2.5 | 5.0 | 1.00 |
| Nicotinic [1] | 4.0 | 3.5 | 2.0 | 0.5 | 3.0 | 5.2 | 0.60 |
| Sorbic [1] | 3.5 | 2.0 | 1.75 | 1.5 | 0.5 | 5.1 | 1.00 |
| Octanoic | (2) | (2) | (2) | (2) | (2) | | |

[1] 0.8 gram rather than 0.8 ml.
[2] No dispersion—asbestos separation.

Table 7 shows the results of varying the quantity of the long-chain cationic additive. The tests were made by preparing a master batch of 20 grams of the asbestos described in connection with Table 1, 3 grams acetic acid, and distilled water to give a total of 2 kilograms. This was mixed for 10 minutes in the Waring Blendor. 200-gram aliquots were withdrawn and the amount of 75 percent active dimethyldicocoammonium chloride shown in the table was added, followed by mixing in the Waring Blendor for 20 seconds. The sample was cooled to room temperature and tested with the results shown:

TABLE 7

| Gram cationic additive (75%) | Percent cationic additive [1] | Fann viscosity data, room temperature | | | | | Overnight pH |
|---|---|---|---|---|---|---|---|
| | | 600 r.p.m. | 300 r.p.m. | A.V. | P.V. | Y.P. | |
| -0- | -0- | 15.5 | 12.5 | 7.75 | 3.0 | | 9.5 |
| 0.025 | 0.94 | 11.5 | 8.5 | 5.75 | 3.0 | | 5.5 |
| 0.05 | 1.88 | 4.0 | 2.5 | 2.0 | 1.5 | 1.0 | |
| 0.10 | 3.75 | 4.0 | 2.0 | 2.0 | 2.0 | -0- | |
| 1.33 | 50.0 | 3.5 | 2.0 | 1.75 | 1.5 | | 0.5 |

[1] Based on the weight of asbestos.

In Table 5A I have already noted the synergistic action involved in employing both the acid additive and the cationic additive of our invention. In that table, examples were given omitting the cationic additive altogether. Again, in Table 7, the synergism was illustrated since the first two entries in that table were for quantities of cationic additive outside of the inventive range, and relatively high apparent viscosities were obtained which were associated with flocculation of the asbestos.

In Table 8, which follows, the synergism is once again illustrated, this time by omitting the acid additive altogether for the first test sample, and then gradually increasing it in subsequent samples until the pH drops down to within the inventive range, the apparent viscosities at the same time dropping below 5.0, and furthermore, the suspensions acquiring the stability previously described.

The results shown in Table 8 were obtained using the same long-chain cationic additive as described in connection with Table 6, using for convenience 12 grams of the asbestos of Table 1, the indicated amount of acetic acid, 1.80 grams of the cationic additive described in connection with Table 6, and tap water. The entire mixture was agitated 10 minutes in the Waring Blendor, then cooled and tested. (Total weight 400 grams, as before.)

TABLE 8

| Acetic acid,[1] ml. | Fann viscosities, room temperature | | | | | pH |
|---|---|---|---|---|---|---|
| | 600 r.p.m. | 300 r.p.m. | A.V. | P.V. | Y.P. | |
| 0 | 29.0 | 16.0 | 14.5 | 13.0 | 3.0 | 9.1 |
| 0.6 | 69.0 | 51.0 | 34.5 | 18.0 | 33.0 | 6.8 |
| 0.7 | 45.0 | 34.0 | 22.5 | 11.0 | 23.0 | 6.3 |
| 0.8 | 12.5 | 11.0 | 6.25 | 1.5 | 9.5 | 5.7 |
| 0.9 | 9.0 | 6.5 | 4.5 | 2.5 | 4.0 | 5.5 |
| 1.2 | 5.5 | 3.0 | 2.75 | 2.5 | 0.5 | 5.0 |
| 1.5 | 5.5 | 3.0 | 2.75 | 2.5 | 0.5 | 4.7 |
| 1.8 | 6.0 | 3.5 | 3.0 | 2.5 | 1.0 | 4.6 |
| 3.6 | 5.0 | 3.0 | 2.5 | 2.0 | 1.0 | 4.0 |

[1] Glacial.

While for convenience a great many of the tests were made with a single type of asbestos, as has already been stated, the invention may be practiced with any chrysotile asbestos or tremolite. Table 9, which follows, gives results for several commercial varieties of chrysotile.

In the tests shown in Table 9, 60 grams of the selected chrysotile asbestos were added to 2,928 grams of distilled water and 12 grams of acetic acid, and sheared 10 minutes in the Waring Blendor. An additional 3,000 grams of distilled water were then added, together with 4 grams of 75 percent dimethyldicocoammonium chloride, sheared for 30 seconds, cooled, and tested.

TABLE 9

| Asbestos | Percent [1] cationic dispersant | Fann viscosities, room temperature | | | | |
|---|---|---|---|---|---|---|
| | | 600 r.p.m. | 300 r.p.m. | A.V. | P.V. | Y.P. |
| 4T04 | 0 | 11.5 | 8.0 | 5.75 | 3.5 | 4.5 |
| | 5 | 6.0 | 4.0 | 3.0 | 2.0 | 2.0 |
| 5R21 | 0 | 10.0 | 7.0 | 5.0 | 3.0 | 4.0 |
| | 5 | 4.0 | 2.0 | 2.0 | 2.0 | 0 |
| 6D28 | 0 | 10.0 | 7.0 | 5.0 | 3.0 | 4.0 |
| | 5 | 3.5 | 2.0 | 1.75 | 1.5 | 0.5 |
| 7D15 | 0 | 6.0 | 4.5 | 3.0 | 1.5 | 3.0 |
| | 5 | 3.0 | 1.5 | 1.5 | 1.5 | 0 |

[1] Based on the weight of asbestos, 100% basis.

The asbestos samples of Table 9 were as follows:
 4T04—well opened, 12.5 percent—4 mesh, 25 percent through 10 mesh, medium fiber
 5R21—semi-crudy, 37.5 percent through 10 mesh, medium short fiber 6D28—crudy, 56 percent through 10 mesh, short fiber 7D15—low bulk, 69 percent through 10 mesh, short fiber All are Canadian chrysotile of Johns-Manville Company, Ltd., and the terms used are those of the asbestos trade.

In Table 10, which follows, commercial tremolite ("ACOA–IT") asbestos from Asbestos Corporation of America was added in the proportion of 60 grams to 2,928 grams of distilled water and 12 grams acetic acid, which was then sheared for 10 minutes in the Waring Blendor. 9,000 grams of distilled water were then added, together with 3 grams of the cationic dispersant described in connection with Table 6. After an additional 30-second agitation, the samples were cooled and tested.

TABLE 10

| Asbestos | Percent [1] cationic | Fann viscosities, room temperature | | | | |
|---|---|---|---|---|---|---|
| | | 600 r.p.m. | 300 r.p.m. | A.V. | P.V. | Y.P. |
| Tremolite | 0 | 17.5 | 12.0 | 8.75 | 5.5 | 6.5 |
| | 5 | 7.5 | 4.5 | 3.75 | 3.0 | 1.5 |

[1] Based on the weight of tremolite.

As mentioned, asbestos may be dispersed in accordance with the invention at substantially higher concentrations than in the foregoing examples, provided, of course, that the mechanical equipment available is powerful enough to exert shearing action on such concentrated suspensions. In Table 11, which follows, some examples are given of the dispersion of chrysotile asbestos in accordance with the invention at concentrations ranging from about 14 percent to about 21 percent by weight asbestos. The equipment used comprised a Manton-Gaulin homogenizer as well as a Cowles dissolver and a "Lightnin" mixer. The first apparatus has been mentioned hereinabove and is further shown on page 3390 of Chemical Engineering Catalogue, Ed. 51, 1967; New York, 1966. The Cowles dissolver resembles somewhat a circular sawblade rotated at a very high r.p.m. in a housing which provides for very high shearing action even with thick suspensions; it is described on page 3530 of the work just cited. The Lightnin mixer is of the dual propeller type and is described in the book by Riegel noted hereinabove, and also in section M–50 of the Chemical Engineering Catalogue already cited.

In the dispersions of Table 11, the amido-amine 0.3 and amido-amine 0.4 correspond to the description thereof given hereinabove in connection with Table 2. The chrysotile asbestos was from a commercial deposit near New Idria, California. Two grades were used: a somewhat longer fibered, lesser processed grade in the first four dispersions shown in Table 11; and a somewhat shorter fiber length, more highly processed grade in the remainder.

Description of the preparation of the several dispersions of Table 11 follows:

DISPERSION I 20.85 lb. asbestos, 0.834 lb. glacial acetic acid, and 83.40 lb. tap water were mixed together for 10 minutes with a Cowles dissolver. This mixture was then passed through a Manton-Gaulin homogenizer operating at 4500 p.s.i. into a tank containing 142 grams of amido-amine 0.3 an approximately 33 gallons of water which was being continuously mixed with a Lightnin mixer. Approximately 25 gallons of this slurry was diluted with 15 gallons of water while mixing with a Lightnin mixer. A sample was taken which gave the results in the accomparnying table.

DISPERSION II 20.00 lb. asbestos, 0.80 lb. glacial acetic acid, 0.20 lb. amido-amine 0.4, and 79.0 lb. water were mixed together for 10 minutes with a Cowless dissolver. 50.0 lb. of this mixture was passed through a Manton-Gaulin homogenizer operating at 4500 p.s.i. into a tank containing 0.10 lb. glacial acetic acid in 20 gallons of water which was continuously being mixed with a Lightnin mixer. Additional water was added to give a final volume of 30 gallons. A sample was taken which gave the results in the accompanying table.

DISPERSION III 20.00 lb. asbestos, 0.80 lb. glacial acetic acid, 0.20 lb. amido-amine 0.4, and 79.0 lb. water were mixed together for 10 minutes with a Cowless dissolver. 50.0 lb. of this mixture was then passed through a Manton-Gaulin homogenizer operating at 4500 p.s.i. into a tank containing 0.10 lb. glacial acetic acid in 25 gallons of water which was continuously being mixed with a Lightnin mixer. An additional 0.20 lb. of glacial acetic acid was added and a sample taken which gave the results in the accompanying table.

DISPERSION IV 20.0 lb. asbestos, 1.40 lb. glacial acetic acid, 0.40 lb. amido-amine 0.4, and 78.2 lb. water were mixed 10 minutes with a Cowless dissolver. This mixture was then passed through a Manton-Gaulin homogenizer operating at 4500 p.s.i. into a tank. This was then diluted with approximately 45 gallons of water while mixing with a Lightnin mixer. A sample was taken which gave the results in the accompanying table.

DISPERSION V 20.0 lb. asbestos, 0.80 lb, glacial acetic acid, 0.10 lb. amido-amine 0.4, and 79.1 lb. tap water were mixed together for 10 minutes with a Cowles dissolver.

(A) 50.0 lb. of this mixture was passed through a Manton-Gaulin homogenizer operating at 4500 p.s.i. into a tank containing 0.10 lb. glacial acetic acid in 20 gallons of water which was being continuously mixed with a Lightnin mixer. Additional water was added to gave a total of 30 gallons. A sample was taken which gave the results in the accompanying table.

(B) 50.0 lb. of this mixture was mixed for one additional hour with the Cowles dissolver after adding 0.10 lb. of acetic acid, 0.05 lb. amido-amine 0.4, and 20.0 lb. water. This was then diluted to a final volume of 30 gallons. A sample was taken which gave the results in the accompanying table.

DISPERSION VI (A) 20.0 lb. asbestos, 0.80 lb. glacial acetic acid, 0.20 lb. amido-amine 0.4, and 79.0 lb. water were mixed 10 minutes with a Cowless dissolver. 50.0 lb. of this mixture was passed through a Manton-Gaulin homogenizer operating at 4500 p.s.i. into a mixing tank. It was then diluted with 30 gallons of water while continuously mixing with a Lightnin mixer. A sample was taken which gave the results in the accompanying table.

(B) An additional 0.10 lb. of glacial acetic acid was added and another sample taken which gave the results in the accompanying table.

DISPERSION VII 21.0 lb. of asbestos, 0.84 lb. glacial acetic acid, 0.21 lb. amido-amine 0.4, and 78.0 lb. tap water were mixed 10 minutes with a Cowless dissolver. This mixture was then passed through a Manton-Gaulin homogenizer operating at 4500 p.s.i. into a tank containing 0.21 lb. of glacial acetic acid in 30 gallons of water which was being continuously mixed with a Lightnin mixer. This was diluted with additional water to gave a final volume of 60 gallons. A sample was taken which gave the results in the accompanying table.

In accordance with the foregoing description, it will be seen that after shearing the asbestos in accordance with the invention at the relatively high concentrations, they were then diluted to concentrations in the range of about 3 percent to about 4½ percent, and tested for pH and rheological properties as set forth generally in connection with the preceding tables. All of the preparations of Table 11 exhibited excellent dispersion, and the suspensions remained stable upon dilution as shown.

TABLE 11

| Dispersion | Asbestos | Percent asbestos sheared | Percent glacial acetic acid [1] | Dispersant | Percent dispersant [1] | Sheared by— | Diluted to percent solids | Fann viscometer data | | | | | pH |
|---|---|---|---|---|---|---|---|---|---|---|---|---|---|
| | | | | | | | | 600 r.p.m. | 300 r.p.m. | A.V. | P.V. | Y.P. | |
| I | AZ-10 | 20.0 | 4.0 | Amido-amine, 0.3 | 1.5 | Manton-Gaulin | 3.06 | 6.0 | 3.5 | 3.0 | 2.5 | 1.0 | |
| II | AZ-10 | 20.0 | 5.0 | Amido-amine, 0.4 | 1.0 | do | 4.19 | 9.0 | 5.5 | 4.5 | 3.5 | 2.0 | 5.45 |
| III | AZ-10 | 20.0 | 7.0 | do | 1.0 | do | 4.13 | 9.0 | 5.5 | 4.5 | 3.5 | 2.0 | 5.4 |
| IV | AZ-10 | 20.0 | 7.0 | do | 2.0 | do | 3.87 | 6.5 | 4.0 | 3.25 | 2.5 | 1.5 | |
| V-A | AZ-20 | 20.0 | 5.0 | do | 0.5 | do | 4.07 | 13.0 | 10.0 | 6.5 | 3.0 | 7.0 | 5.35 |
| VI-A | AZ-20 | 20.0 | 4.0 | do | 1.0 | do | 3.87 | 10.0 | 7.0 | 5.0 | 3.0 | 4.0 | 5.8 |
| VI-B | AZ-20 | 20.0 | 5.0 | do | 1.0 | do | 3.87 | 8.5 | 5.0 | 4.25 | 3.5 | 1.5 | 5.45 |
| VII | AZ-20 | 21.0 | 5.0 | do | 1.0 | do | 4.43 | 10.0 | 7.0 | 5.0 | 3.0 | 4.0 | 4.95 |
| V-B | AZ-20 | 14.3 | 5.0 | do | 1.0 | Cowles Diss | 4.08 | 7.5 | 4.0 | 3.75 | 3.5 | 0.5 | 5.4 |

[1] Based on the weight of asbestos.

As previously stated, the amount of organic acid should be such as to give a pH of not higher than 6, and preferably within the range of four to five; and moreover, that the amount to accomplish this varies with the type of asbestos. As an example of such variation, Table 12, which follows, shows the results of tests in which the AZ-20 asbestos described in connection with Table 11 was used with varying amounts of acetic acid. For this series of tests, 12.0 gm. of AZ-20 asbestos, 0.12 gm. amido-amine 0.3 (as used in Table 2), and 400.0 gm. of tap water were mixed for ten minutes in a Waring Blendor. The indicated amount of acetic acid was then added and the pH and rheological characteristics determined, with the results as follows:

TABLE 12

| Percent acetic acid [1] | Ml. acetic acid | Fann viscometer data | | | | | pH |
|---|---|---|---|---|---|---|---|
| | | 600 r.p.m. | 300 r.p.m. | A.V. | P.V. | Y.P. | |
| 0 | 0 | 67.0 | 51.0 | 33.5 | 16.0 | 35.0 | 8.9 |
| 0.975 | 0.1 | 90.0 | 65.0 | 45.0 | 25.0 | 40.0 | 6.7 |
| 1.75 | 0.2 | 84.0 | 61.0 | 42.0 | 23.0 | 38.0 | 6.2 |
| 2.625 | 0.3 | 18.0 | 14.0 | 9.0 | 4.0 | 10.0 | 5.3 |
| 3.50 | 0.4 | 10.0 | 6.0 | 5.0 | 4.0 | 2.0 | 4.9 |
| 4.375 | 0.5 | 9.25 | 5.0 | 4.68 | 4.25 | 0.75 | 4.7 |
| 5.25 | 0.6 | 8.0 | 4.25 | 4.0 | 3.75 | 0.5 | 4.6 |
| 12.25 | 1.4 | 8.5 | 4.25 | 4.25 | 4.25 | 0 | 4.1 |

[1] Based on the weight of asbestos using the formula:

$$\frac{(\text{ml. acetic acid})(1.05 \text{ gm./ml.})}{12 \text{ gm.}} \times 100$$

It may be observed from the above tabulation that as little as 2 percent acetic acid (a ratio of 1:50) on the weight of asbestos sufficed to lower the pH to 6. The first three entries in Table 12, having pH's higher than 6, were not stable dispersions; the remainder, having pH's lower than 6, were. (In comparing these results with those of Table 1, for example, it should be borne in mind that the mixtures of Table 12 were 3 percent by weight of asbestos, rather than the 1 percent mixtures of Table 1, so that the apparent viscosities are naturally higher.)

While the invention has been described with the aid of numerous examples, in which particular starting materials, reagents, concentrations, processing times and temperatures, and processing apparatus have been used, it is to be understood that all of these factors are subject to considerable variation within the broad scope of the invention, in accordance with the claims which follow.

Having described the invention, I claim:

1. A process of forming a stable aqueous dispersion of an asbestos mineral selected from the group which consists of chrysotile, tremolite, and mixtures thereof, wherein said mineral is sheared while in suspension in an aqueous solution of chemical additives dissolved therein so as to disaggregate said mineral into its individual submicroscopic fibrils, characterized by the following:

that the said chemical additives consist essentially of: an organic acid selected from the group which consists of:

(a) alkyl, alkenyl and alkadienyl monocarboxylic acids from $C_1$ through $C_6$;

(b) alkyl, alkenyl and alkadienyl monocarboxylic acids from $C_1$ through $C_6$ having up to five hydroxyl groups attached to the hydrocarbon radical;

(c) alkyl, alkenyl and alkadienyl monocarboxylic acids from $C_1$ through $C_6$ having up to two chlorine atoms attached to the hydrocarbon radical;

(d) alkyl, alkenyl and alkadienyl monocarboxylic acids from $C_1$ through $C_6$ having an oxygen double-bonded to a hydrocarbon radical carbon;

(e) alkyl, alkenyl and alkadienyl monocarboxylic acids from $C_1$ through $C_6$ having a methoxy group attached to a hydrocarbon radical carbon;

(f) alkyl, alkenyl and alkadienyl sulfonic acids from $C_1$ through $C_4$;

(g) alkyl, alkenyl and alkadienyl arsonic acids from $C_1$ through $C_4$;

(h) pyridine carboxylic acids;

and mixtures thereof;

and a long-chain cationic reagent which is a substituted ammonium cation having at least one onium and at least fourteen carbon atoms in the cationic molecule, said cationic reagent being present in a weight ratio to said asbestos of at least 1:100; and said organic acid being present in a concentration sufficient to produce a pH of between three and six in said suspension.

2. The process in accordance with claim 1 wherein said asbestos is present in a concentration of from about 0.1 percent to about 25 percent by weight of said aqueous suspension;

and wherein said organic acid is present in a weight ratio to said asbestos of between about 1:50 and 1:2.

3. The process in accordance with claim 1 wherein said long-chain cationic reagent is the reaction product of a polyethyleneamine selected from the class consisting of diethylene triamine, triethylenetetramine, and tetraethylenepentamine and sufficient of a fatty acid having a least eight carbon atoms to react with at least one of the amino groups of the polyethyleneamine but insufficient to react with all of such amino groups, said reaction product having been heated to at least 400° F. so as to result in conversion of salt linkages to amide linkages.

4. The process in accordance with claim 3 wherein said polyethyleneamine is tetraethylenepentamine and said fatty acid is tall oil fatty acid.

5. The process in accordance with claim 1 wherein said substituted ammonium cation is dimethyl hydrogenated tallow benzylammonium.

6. The process in accordance with claim 1 wherein said substituted ammonium cation is octadecylammonium.

7. The process in accordance with claim 1 wherein said substituted ammonium cation is dimethyldicocoammonium.

8. The process in accordance with claim 1 wherein said substituted ammonium cation is a substituted imidazoline having the formula 1-$R_1$, 2-$R_2$, 2-imidazoline, where $R_1$ is selected from the class consisting of 2-amino methyl, 2-amino ethyl, 2-hydroxy methyl, 2-hydroxy ethyl; and $R_2$ is selected from the class consisting of $C_{14}$–$C_{18}$ inclusive, alkyls, alkenyls and alkadienyls.

9. The process in accordance with claim 1 wherein said organic acid is acetic.

10. The process in accordance with claim 3 wherein said organic acid is acetic.

References Cited

UNITED STATES PATENTS

| 2,626,213 | 1/1953 | Novak | 252—313X |
| 2,661,287 | 12/1953 | Barbaras | 252—313X |
| 3,169,113 | 2/1965 | Kirkpatrick et al. | 252—356X |

RICHARD D. LOVERING, Primary Examiner

U.S. Cl. X.R.

106—308; 162—3; 252—357